United States Patent Office 3,387,492
Patented June 11, 1968

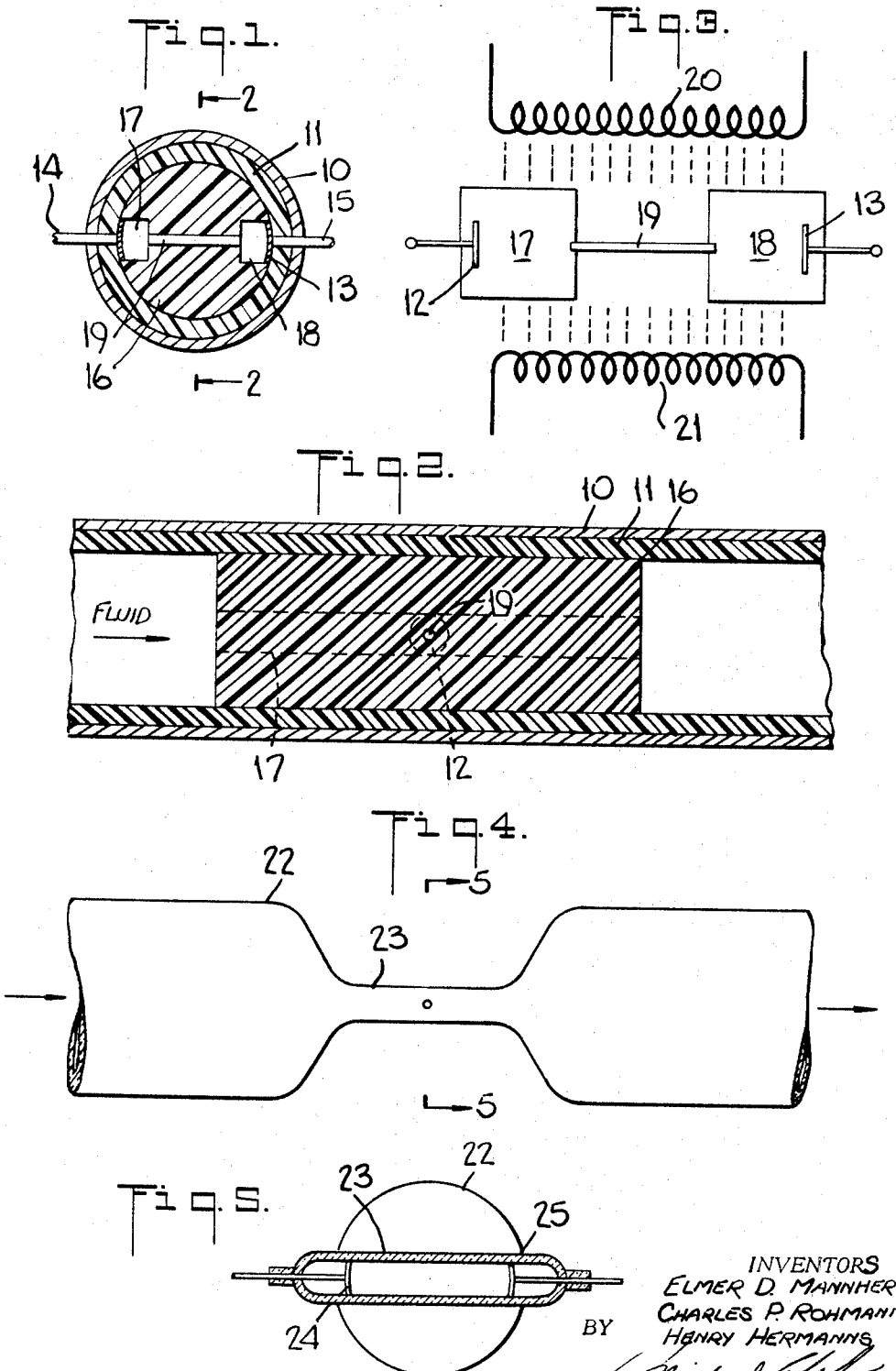

3,387,492
MAGNETIC FLOWMETERS FOR
LOW FLOW RATES
Elmer D. Mannherz, Southampton, Charles P. Rohmann, Hatboro, and Henry Hermanns, Ardsley, Pa., assignors to Fischer & Porter Co., Warminster, Pa., a corporation of Pennsylvania
Filed May 2, 1966, Ser. No. 546,785
5 Claims. (Cl. 73—194)

ABSTRACT OF THE DISCLOSURE

A magnetic flowmeter adapted to accurately measure low flow rates, the meter including a filler rod of insulating material which is inserted in a pipe section having a pair of electrodes disposed at diametrically opposed points, the rod having two parallel channels formed longitudinally therein at diametrically opposed positions encompassing the electrodes, whereby the fluid to be measured flows through these channels which serve to reduce the effective cross-sectional area of the pipe section thereby to increase the velocity of fluid therein.

This invention relates generally to electromagnetic flowmeters, and more particularly to improved flowmeter structures adapted to provide accurate measurements at low flow rates.

The magnetic flowmeter is adapted to measure volume rates of those fluids which present difficult handling problems, such as corrosive acids, sewage, slurries, detergents, and the like. In a magnetic flowmeter, a uniformly distributed magnetic field is generated which is mutually perpendicular to the longitudinal axis of the meter pipe through which the fluid flows and to the axes of the meter electrodes. Since the velocity of the fluid is directed along the longitudinal axis of the pipe, the voltage induced within the fluid will be perpendicular to both the velocity of this fluid and the flux linkages of the magnetic field. Thus the metered fluid constitutes a series of fluid conductors moving through the magnetic field. The more rapid is the rate of flow, the greater the instantaneous value of the voltage established at the electrodes.

Conventional flowmeters make use of a flanged stainless steel pipe section, the inner pipe and flange surfaces being lined with an insulating material such as Teflon or vitreous enamel. Two cylindrical electrodes are mounted at diametrically opposed positions in the central portion of the pipe section, and are completely insulated from the pipe by bushings. The end surfaces of the electrodes are flush with the inner surface of the insulating liner and come in contact with the fluid to be metered. A field coil assembly is provided consisting of two saddle-shaped magnet coils surrounded by a box-shaped laminated iron core, which in turn completely encompasses the central portion of the flowmeter. The field coil assembly is designed to produce a linear and uniform magnetic field through the metering section.

The instantaneous voltage developed across the meter electrodes represents the average fluid velocity of the flow profile passing the electrodes at a given moment, and the flowmeter will produce an output signal equal to a continuous average flow rate regardless of whether the flow profile is laminar or turbulent. A flowmeter output signal is stably and linearly proportional to the volumetric rate of flow through it. However, to obtain such accurate results, the metering pipe must be completely filled at all times. The flowmeter will continue to operate with full flow output signals as long as the metering fluid level is sufficient to maintain contact with the meter electrodes. Since the volume rate is proportionally related to fluid velocity by means of the constant area or diameter of the meter pipe section, a partially filled pipe incurs error in a direct relation of the fluid area to the pipe area.

With low flow rates, it is the practice to use flow pipe sections of minimum size to insure filling the pipe. There is, however, a practical physical limitation to the minimum size flowmeter which can be built. This limitation is a function of the material of the liner as well as the method used for sealing the electrodes. In practice, it has been found that 5/32″ diameter is the smallest-size, Teflon-lined meter which can be constructed, while 1/10″ diameter is the smallest vitreous enamel lined meter it is feasible to make. For very low rates, even these sizes are too large for accurate measurements.

Accordingly, it is the main object of this invention to provide a magnetic flowmeter capable of accurately measuring low flow rates.

More specifically, it is an object of the invention to provide a flowmeter using a pipe section of minimum size and having a sensitivity far greater than prior-art structures of the same dimensions, whereby it is possible to measure flow rates which are but a fraction of the rates which heretofore could accurately be measured. Thus the invention has made it possible to increase the sensitivity of a 5/32″ meter by a factor of 4 and thereby measure flow rates one-fourth as small as the minimum listed for this size.

Briefly stated, these objects are attained by inserting into the pipe section of the flowmeter an insulating rod which reduces the effective cross-sectional area of the section and thereby increases the flow velocity therethrough, without in any way interfering with the electromagnetic field established across the pipe section.

For a better undertsanding of the invention as well as other objects and further features thereof, reference is made to the following detailed description thereof to be read in conjunction with the accompanying drawing, wherein:

FIG. 1 is a cross-section taken through a magnetic flowmeter pipe structure in accordance with one embodiment of the invention;

FIG. 2 is a longitudinal section taken in the plane indicated by line 2—2 in FIG. 1;

FIG. 3 is a schematic diagram of the flowmeter structure shown in FIGS. 1 and 2;

FIG. 4 is a perspective view of a magnetic flowmeter pipe section in accordance with another embodiment of the invention; and FIG. 5 is a section taken through the plane indicated by line 5—5 in FIG. 4.

Referring now to the drawings, and more particularly to FIGS. 1 and 2, there is shown a magnetic flowmeter in accordance with the invention for accurately measuring low flow rates, the meter including a metal pipe section 10 of circular cross-section, made of stainless steel or other suitable material. Inserted in pipe section 10 is a tubular insulating liner 11, which may be of Teflon or other material which is non-reactive with the fluids being measured. Two cylindrical electrodes 12 and 13 are mounted at diametrically opposed points in the central portion of the pipe section, the end surfaces of the electrodes having a curvature conforming to that of the liner. The signal established between the electrodes is picked up by suitable leads 14 and 15.

Received within liner 11 is a filler rod 16 of plastic material, the diameter of the rod being substantially equal to the internal diameter of the liner 11 whereby the rod telescopes snugly therein. Cut longitudinally into the rod at diametrically opposed positions along the full length thereof, are two identical grooves 17 and 18, preferably having a rectangular cross-section. Grooves 17 and 18 define a pair of narrow flow channels which encompass electrodes 12 and 13 and lie in parallel relation to the longitudinal axis of the pipe section.

The dimensions of grooves 17 and 18 are such as to reduce the effective flow area to approximately one-tenth of the flow area defined by liner 11. The invention is by no means limited to this specific reduction in effective flow area, and in practice, a greater or smaller reduction may be made, depending on the parameters of the system and the anticipated flow rates to be measured. It is to be understood that should the meter be constructed with a nonmetallic pipe section, such as one made of fiberglass, then a liner is unnecessary, and the filler rod for reducing the effective flow area can be inserted directly into the pipe section.

Transversely positioned within plastic rod 16 is a non-magnetic electrically-conducting plug 19 whose longitudinal axis is aligned with the axes of the electrodes. Plug 19 acts electrically to interconnect the flow channels and thereby complete the electrical path between the electrodes. The electrodes may be made of stainless steel, or for highly corrosive uses, platinum electrodes may be employed. The choice of plug material similarly depends on the chemical nature of the fluids being measured.

As shown in FIG. 3, a uniform magnetic field is produced in a plane perpendicular to the flow path of fluid through channels 17 and 18, by means of a pair of electromagnetic coils 20 and 21. The electromagnetic arrangement as such is well known and is disclosed in greater detail in U.S. Patent to Head, 3,005,342. The excitation of the coils is preferably with a commercially available sixty-cycle alternating voltage, although other frequencies may be used.

Voltage generated by the flow of fluid in channels 17 and 18 passing through the electromagnetic field is detected by electrodes 12 and 13 whose positions are normal to the direction of the field. Channels 17 and 18 are insulated electrically from each other, but plug 19 provides an electrical path therebetween. The operation of the meter is based on Faraday's law of electromagnetic induction, and as the fluid moves transversely through the uniform magnetic field, a voltage is induced therein which is proportional to the rate of fluid flow, as long as the channels are completely filled at all times.

Because of the pastic rod in the pipe section acts to increase the velocity of fluid through the metering section, the sensitivity of the meter and the resultant signal is enhanced. As pointed out previously, in practice this sensitivity may be increased by a factor of 4 and higher. Alternatively, it is also possible to attain an increase in sensitivity by supporting an insulating rod concentrically within the pipe section whereby the fluid flows through an annular channel, in which event it is not necessary to provide a plug to complete the connection between two electrically isolated channels. But in this arrangement, ribs or other means called for to support the insulating rod, form an obstruction in the annular flow channel.

Another technique which can be used to raise the sensitivity of a flowmeter so that low flow rates may be accurately measured, is by changing the shape of the flow area in the metering section. In conventional metering pipes of circular cross-section, the equation for the signal generated by fluid flow is:

$$S = Bdv \quad (1)$$

where $S$ = signal in volts
$B$ = flux density, webers/in.²
$d$ = distance between electrodes in inches
$v$ = fluid veloicty in inches per second The flow equation is:

$$Q = \frac{\pi d^2 v}{4} \quad (2)$$

where $Q$ = flow rate in in.³/sec. Substituting Equation (2) in Equation (1), $$S = \frac{4}{\pi} \frac{BQ}{d} \quad (3)$$

But for a pipe whose flow area has a rectangular cross-section, whose width, measured along the electrode axes, is "$w$," and whose height is "$h$," the equation for flux signal becomes:

$$S = Bwv \quad (4)$$

The flow equation becomes:

$$Q = whv \quad (5)$$

Substituting Equation (5) into equation (4):

$$S = BQ/h \quad (6)$$

Hence by constructing a meter in which the height "$h$" of the flow tube is considerably smaller than "$d$," the distance between electrodes, a considerable increase in sensitivity may be attained.

Thus, as shown in FIG. 4, a pipe section 22 of circular cross-section is provided, which section may be lined. The central portion 23 of the pipe section is flattened so that its height "$h$" is much smaller than its width "$w$." Hence the signal developed between the electrodes 24 and 25 placed at the opposing sides in the flattened portion 23 is considerably stronger than that attainable with a pipe of circular cross-section. The electromagnetic coils are mounted on the flattened portion in the usual manner.

While there have been shown and described preferred embodiments of magnetic flowmeters in accordance with the invention, it will be appreciated that many changes and modifications may be made therein without, however, departing from the essential spirit of the invention as defined in the annexed claims.

What we claim is:
1. A magnetic flowmeter for accurately measuring low flow rates, said flowmeter comprising:
   (a) a pipe section,
   (b) a pair of electrodes disposed at diametrically opposed points in said section,
   (c) means to establish a uniform electromagnetic field in a direction normal to the flow of fluid through said section to induce a voltage in said fluid which depends on the velocity thereof and is detected by said electrodes, and
   (d) means to reduce the effective cross-sectional area of said section to increase the velocity of fluid therein, said means being constituted by a filler rod of insulating material inserted in said section, said rod having two parallel channels formed longitudinally therein at diametrically opposed positions which encompass said electrodes, whereby the fluid flows through said channels, and
   (e) means to form an electrical path between said channels to complete the electrode circuit.

2. A flowmeter, as set forth in claim 1, wherein said pipe section and said filler rod have a circular cross-section and said channels have a rectangular cross-section.

3. A flowmeter, as set forth in claim 1, wherein said pipe section is of metal and is lined with an insulating tube.

4. A flowmeter, as set forth in claim 1, wherein said means forming an electrical path between said channels is constituted by a metallic plug transversely disposed in said rod in alignment with the axes of said electrodes.

5. A flowmeter, as set forth in claim 1, wherein the cross-sectional area of said section is reduced by said rod to about 1/10 of its original value.

References Cited

UNITED STATES PATENTS 2,733,604    2/1956    Coulter _____ 73—194

OTHER REFERENCES

Kolin: Review of Scientific Instruments, vol. 16, No. 8, August 1945, pp. 209–214.

RICHARD C. QUEISSER, *Primary Examiner.*

C. A. RUEHL, *Examiner.*